(No Model.) C. A. WHITE. 2 Sheets—Sheet 1.
LIQUID MEASURING VESSEL.
No. 455,554. Patented July 7, 1891.
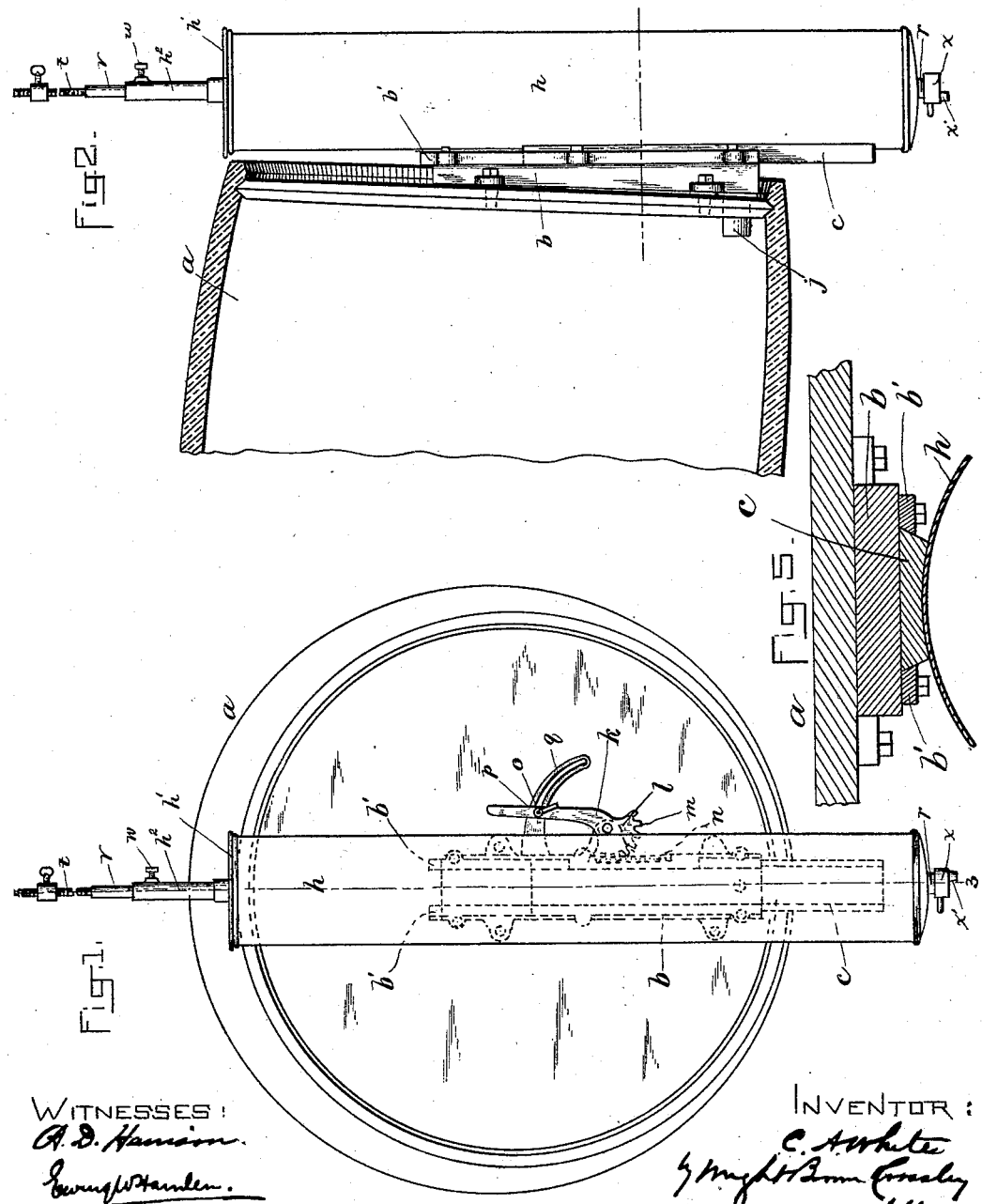

(No Model.) 2 Sheets—Sheet 2.
C. A. WHITE.
LIQUID MEASURING VESSEL.
No. 455,554. Patented July 7, 1891.
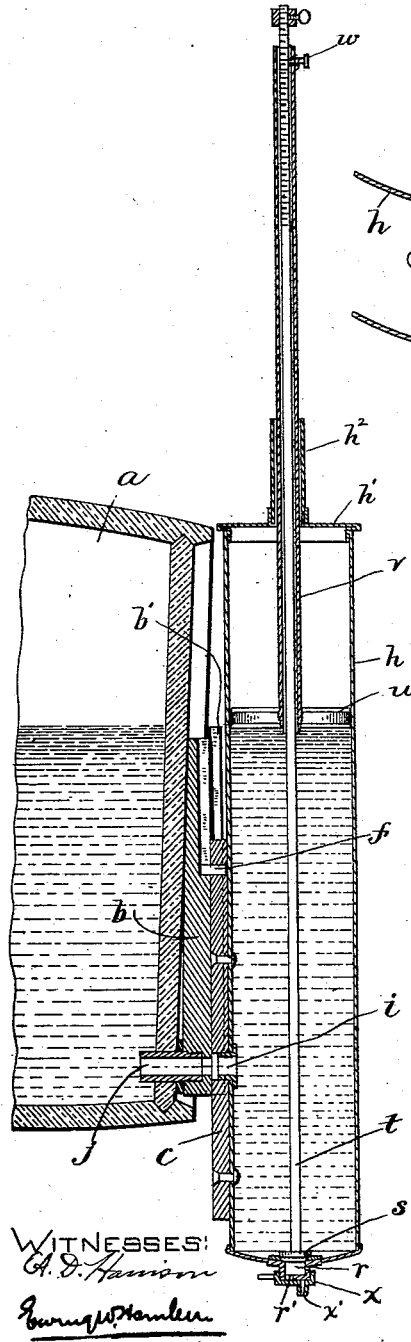
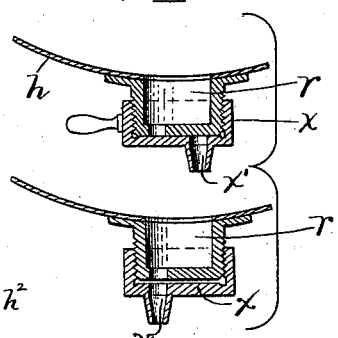
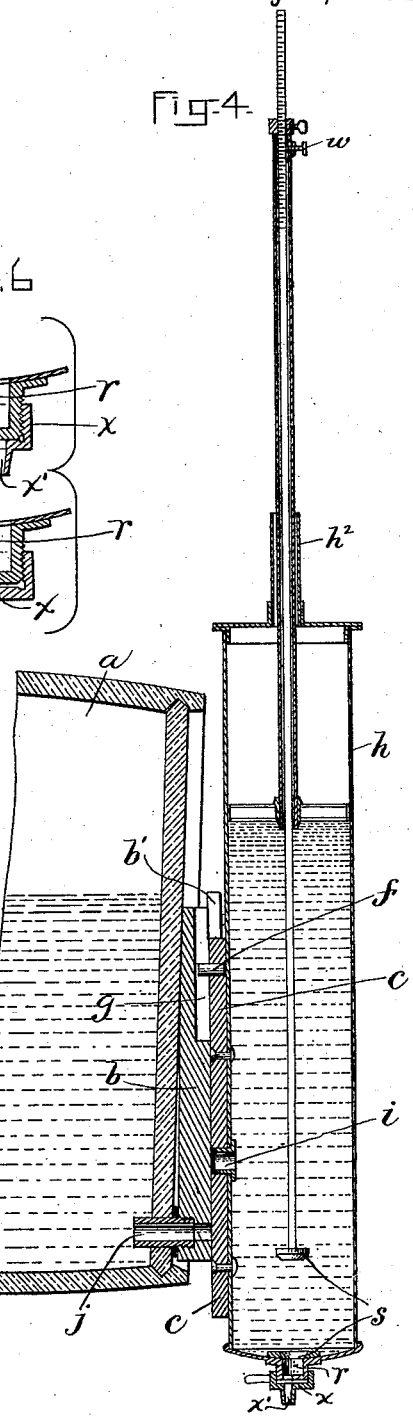
WITNESSES:
INVENTOR:

UNITED STATES PATENT OFFICE.

CHARLES A. WHITE, OF OSSIPEE, NEW HAMPSHIRE.

LIQUID-MEASURING VESSEL.

SPECIFICATION forming part of Letters Patent No. 455,554, dated July 7, 1891.

Application filed September 13, 1890. Serial No. 364,850. (No model.)

*To all whom it may concern:*

Be it known that I, CHARLES A. WHITE, of Ossipee, in the county of Carroll and State of New Hampshire, have invented certain new and useful Improvements in Apparatus for Measuring Liquids, of which the following is a specification.

This invention has for its object to provide an apparatus whereby liquids such as molasses and other liquids which are commonly kept for sale may be drawn from the original package or receptacle in any predetermined quantity and automatically shut off when the predetermined quantity has been delivered.

The invention consists, first, in an apparatus comprising a receptacle adapted to be attached or connected to a hogshead or other liquid-holding package, so as to receive a charge of liquid from the latter, a valve which controls the discharge of liquid from said receptacle, and a float adapted to be supported by the accumulation of liquid in the receptacle, said float being adjustably connected with the valve, so that the valve may be set at any desired distance from the float, and will therefore close to shut off the escape of liquid when the float has descended by the subsidence of the liquid far enough to bring the valve to a bearing on its seat.

The invention also consists in certain incidental improvements, all of which I will now proceed to describe and claim.

Of the accompanying drawings, forming a part of this specification, Figure 1 represents an end view of a molasses-hogshead having my improved apparatus attached thereto. Fig. 2 represents a side view of my improved apparatus and a sectional view of the hogshead. Fig. 3 represents a section on line 3 3 of Fig. 1. Fig. 4 represents a similar section showing the receptacle raised to disconnect its inlet from the outlet of the hogshead and the valve raised to permit the escape of a portion of the contents of the receptacle.

The same letters of reference indicate the same parts in all the figures.

In the drawings, $a$ represents a hogshead, to one end or head of which is affixed by screws or other suitable fastenings a vertical plate $b$, having vertical dovetail-guides $b'$. Between said guides is fitted a slide $c$, the edges of which are correspondingly beveled to engage the guides, said slide being vertically movable between the guides and adapted to be depressed until a stud $f$, attached to the slide $c$ and projecting into a slot $g$ in the plate $b$, strikes the lower end of said slot, as shown in Fig. 3. To the slide $c$ is attached an elongated receptacle $h$, preferably of cylindrical form, and provided with an inlet-opening $i$, which, when the slide is in the depressed position shown in Fig. 3, coincides with the outlet $j$ of the hogshead, so that the receptacle, when in the last-described position, receives a charge of liquid from the hogshead. I provide means for raising the receptacle $h$ until its inlet $i$ is out of line with the outlet $j$ of the hogshead, as shown in Fig. 4, thus cutting off the communication between the hogshead and the receptacle. Said means may be a lever $k$, pivoted at $l$ to an ear on the plate $b$ and provided with gear-teeth $m$, meshing with rack-teeth $n$ on the slide $c$, as shown in Fig. 1, said lever being adapted when its upper end is moved downwardly to raise the slide and the receptacle thereon from the position shown in Figs. 1, 2, and 3 to that shown in Fig. 4.

The receptacle may be secured in the last-described position by locking the lever $k$, and this may be accomplished by a clamping-nut $o$ and a bolt $p$, co-operating therewith, said bolt being adapted to slide in a segmental slot $q$ in an arm formed in the plate $b$. By tightening the nut $o$ the lever may be secured at any position within the length of the slot $q$. Any other suitable means may be employed, however, for raising the slide and the receptacle thereon and for holding the same in their raised positions, my invention not being limited to the devices above described.

The bottom of the receptacle $h$ is provided with an outlet $r$ for the discharge of the contents of the receptacle into a jug or other receiver placed below it. The upper end of said outlet is formed as a seat for the valve $s$, which is adapted to tightly close said outlet and prevent the escape of liquid therefrom. Said valve is attached to a stem $t$, which extends upwardly through the receptacle and through the cover thereof to a considerable distance above the receptacle.

$u$ represents a float which is adapted to rest upon the surface of the accumulation of liquid in the receptacle, and is provided with a vertical tube $v$, which is supported by the float, and projects upwardly therefrom through the cover of the receptacle, the valve rod or stem $t$ passing through the center of the float and through the tube $v$, its upper end projecting above the upper end of the tube. The valve-stem may be adjusted vertically in the float-tube to vary the distance between the valve and the float, the stem being held in the tube at any position at which it may be adjusted either by friction or by a positive locking or securing device, such as a set-screw $w$, inserted in the tube and bearing against the stem.

When it is desired to draw a given quantity of liquid from the receptacle, the valve and its stem are raised until the valve is at such a distance from its seat at the bottom of the receptacle as that the desired quantity of liquid will escape from the receptacle while the valve is descending with the float to its seat, the valve-stem being provided with a series of marks or graduations, which guide the operator in adjusting the valve. For example, if a gallon of liquid is to be drawn, the operator raises the stem until the valve is raised above the bottom of the receptacle by a space which holds a gallon of liquid. A cap or gate $x$, which is adapted to cover and uncover the outlet $r$ at its lower, is then turned to permit the flow of the liquid through the outlet. As the liquid falls the float and valve of course fall with it until the valve comes to a bearing on its seat and prevents the further escape of the liquid. The cap $x$ is internally screw-threaded, and the exterior outlet nipple or projection $r$ is correspondingly threaded and engaged with the external thread of the cap. The cap is provided with a nozzle $x'$, which is eccentric to an orifice $r'$ in the bottom of the outlet nipple or projection $r$. When the cap is turned in one direction, it is brought up close against the bottom of the outlet nipple or projection, and at the same time its nozzle $x'$ is thrown out of line with the orifice $r'$, as shown in Fig. 3. When the cap $x$ is turned in the opposite direction, the cap is slightly separated from the outlet nipple or projection and the nozzle $x'$ is brought into line with the orifice $r'$, as shown in Fig. 4, thus allowing the flow of liquid from the receptacle. I do not limit myself to this particular device or gate to open and close the outlet, but may use any suitable device adapted to be operated from the exterior, it being necessary to have some device for shutting off the flow of liquid while the valve $s$ is being adjusted in the manner above described.

The described apparatus will be operated without making the receptacle $h$ vertically movable by providing the outlet $j$ of the hogshead with a movable valve, so that the communication between the hogshead and the receptacle may be shut off without moving the receptacle. I prefer, however, to make the receptacle movable, because when the receptacle is raised, as shown in Fig. 4, space is afforded under it for the reception of a jug or other receiver. It is also desirable to lower the receptacle when it is receiving liquid from the hogshead, so that the bottom of the receptacle will be below the bottom of the hogshead, and thus enable all the liquid in the hogshead to flow into the receptacle.

The receptacle has a cover $h'$, having a tubular guide $h^2$, in which the tube $v$ is adapted to slide.

I claim—

1. The improved liquid-measuring apparatus consisting of a receptacle adapted to be connected to a hogshead or other liquid-holding package and provided with an outlet having a gate or external shut-off, a valve within the receptacle adapted to control the passage of liquids through the outlet, said valve having a stem projecting through the top of the receptacle, and a float movable in the receptacle and provided with an upwardly-extending rod or tube engaged, as described, with the valve-stem, the valve being adjustable toward and from the float, substantially as and for the purpose specified.

2. In a liquid-measuring apparatus, the combination of a plate provided with vertical guides and adapted for attachment to a hogshead or other package, said plate having an opening communicating with the outlet of the hogshead, a slide adapted to move on said guides, a receptacle attached to said slide and provided with an inlet arranged to coincide with the outlet-opening in the plate when the slide is depressed, and an outlet in its lower portion having a suitable gate or shut-off, means for holding the slide and receptacle in a raised position with its inlet disconnected from the outlet-opening in the plate, a valve within the receptacle adapted to control the outlet, an upwardly-projecting stem on said valve, and a float movable in the receptacle and provided with an upwardly-extending rod or tube engaged, as described, with the valve-stem to support the valve at various distances from the float, as set forth.

3. The receptacle $h$, having an externally-threaded outlet nipple or projection provided with an eccentrically-arranged orifice, combined with the internally-threaded cap having an eccentrically-arranged outlet-nozzle adapted to be connected with and disconnected from said orifice by partial rotary movements of the cap, as set forth.

4. The combination of the plate $b$, adapted to be attached to a hogshead, the lever $k$, pivoted to said plate and provided with teeth $m$, the slide adapted to move on guides on the plate $b$ and provided with teeth $n$, and the receptacle $h$, attached to said slide, all arranged and operating substantially as set forth.

In testimony whereof I have signed my name to this specification, in the presence of two subscribing witnesses, this 8th day of September, A. D. 1890.

CHARLES A. WHITE.

Witnesses:
J. W. CHAMBERLIN,
URIAH S. JACKSON.